United States Patent [19]

Miessler et al.

[11] Patent Number: 4,798,919

[45] Date of Patent: Jan. 17, 1989

[54] GRAPHICS INPUT TABLET WITH THREE-DIMENSIONAL DATA

[75] Inventors: Milan Miessler, Romsey; Rafael Pascual, Winchester, both of England

[73] Assignee: International Business Machines Corporation, Armonk, N.Y.

[21] Appl. No.: 166,957

[22] Filed: Mar. 11, 1988

[30] Foreign Application Priority Data

Apr. 28, 1987 [GB] United Kingdom ............... 8710033

[51] Int. Cl.⁴ .............................................. G08C 21/00
[52] U.S. Cl. .................................................... 178/18
[58] Field of Search ........................... 178/18, 19, 20

[56] References Cited

U.S. PATENT DOCUMENTS 4,687,885 8/1987 Talmage et al. ...................... 178/18

*Primary Examiner*—Stafford D. Schreyer
*Attorney, Agent, or Firm*—Philip J. Feig

[57] ABSTRACT

A graphics input tablet has a conductive layer and a resistive layer with contacts (16,17,23,24) arranged one along each edge of the resistive layer. The conductive layer is held at a negative potential relative to the resistive layer so current flows in each contact when localized pressure is applied to a region of the tablet (20) to bring the layers into electrical contact. The currents vary with both position and magnitude of the localized pressure. The position of the pressure is detected from the relative currents in opposed contacts and the magnitude of the pressure is detected from the total current in the contacts. The currents are measured by current sense amplifiers and processed in a computer. Analogue front-end processing of the currents is also possible.

10 Claims, 5 Drawing Sheets

GRAPHICS INPUT TABLET WITH THREE-DIMENSIONAL DATA

BACKGROUND OF THE INVENTION

This invention relates to a graphics input tablet. The invention is particularly useful in the data processing field where it may be employed to input data of a graphical nature into a data processing machine.

BACKGROUND ART

In the data processing field one of the major problems to users of a system is the rapid inputting of data. This has traditionally been achieved with a keyboard but when it is necessary to input graphical data, rather than character strings, a keyboard is grossly inefficient. There are various examples in the prior art of attempts to provide a more efficient and easier to use input means for graphical data.

One such example is disclosed in EP 5,996 (Quest Automation Ltd.) which shows an electrographic apparatus with two resistive layers, one overlying the other, held apart by a framework but arranged to be brought into contact by the pressure of a stylus or similar. Excitation voltages are applied to the resistive layer at 90 degrees to each other and two analogue voltages related to the position of the stylus are obtained in an unspecified manner. Another example is disclosed in GB 2,088,063 (Robert Branton). This shows a conductive layer overlying a rectangular resistive layer with an insulating mesh between the two. The resistive layer has a contact at each corner and one opposed pair of contacts is energized at any one time. A stylus (ballpoint pen or similar) is pressed onto the upper, conductive layer which then makes contact, through a gap in the insulating mesh, with the resistive layer. In consequence, the potential of the conductive layer equals thatof the resistive layer at the point of contact; since this varies with the relative distances of the point from each of the polarized contacts, the potential of the conductive layer provides information to identify the position of the stylus. Once the position with respect to these polarized contacts is established they are de-energized and the other pair is polarized to give information regarding the position of the stylus along a different axis. Thus the position of the stylus in two dimensions may be identified.

SUMMARY OF THE INVENTION

The prior art techniques only permit two dimensional input directly from the tablet; if a third dimension is required it must be input by other means, e.g., a potentiometer arranged for manual control. The ability to input three dimensional data using the tablet alone would be very useful, for example (a) to define the color and/or intensity of a location on a graphic terminal or (b) for signature verification where the profile of the pressure applied across the signature would be a useful additional check, above and beyond a two dimensional check of the appearance of the signature. Further, the prior art techniques do not permit the pressure information to be detected at all; this information could be useful, for example in the case of a one dimensional position-detecting tablet in the form of a strip. This would provide two dimensional input capability without occupying the large area taken up by a prior art 2-D input tablet.

Accordingly, the present invention provides a graphics input tablet comprising a layer of electrically resistive material supported co-extensively with a layer of electrically conductive material to provide a flat tablet surface, the resistive material having the property that the electrical resistance between the layers in the region of localized pressure applied thereto changes monotonically with the applied pressure, first and second conductors connected respectively to first and second portions of the resistive layer said portions being spaced apart on a first notional line across the tablet surface, the construction and arrangement being such that with an electrical potential applied between the resistive layer and the conductive layer substantially no current flows through said first and second conductors, but with said localized pressure applied to said tablet surface currents flow through said first and second conductors, the relative magnitudes of the currents being related to the respective distances of the region of applied pressure from the first and second portions and the total current flowing between the resistive sheet and the conductive sheet being related to the magnitude of the applied pressure.

This provides the facility to detect the position of a stylus in two dimensions, i.e., one linear dimension and one pressure dimension.

Preferably, the graphics input tablet further comprises third and fourth conductors connected respectively to third and fourth portions of the resistive layer, said portions being spaced apart on a second notional line, intersecting said first notional line, across the tablet surface, such that when said localized pressure is applied in said region, currents flow in said third and fourth conductors, the relative magnitudes of the currents in the third and fourth conductors being related to the respective distances of said third and fourth portions from the area of applied localized pressure.

This provides the facility to detect the position of a stylus in three dimensions, i.e., two linear dimensions and one pressure dimension.

Preferably, the graphic input tablet has electrical sensing means arranged to evaluate said total current by summing the individual currents measured in each of said conductors.

Alternatively, the graphics input tablet has electrical sensing means arranged to evaluate said total current from a measurement of the current flowing between the electrical excitation means and the conductive layer.

The resistive layer may be in the form of a single sheet of material. Alternatively, the resistive layer may comprise two sheets, each of a resistive material, the conductors being connected to a first of said sheets and the second of said sheets having the property as aforesaid that the electrical resistance between the layers in the region of localized pressure applied thereto changes monotonically with the magnitude of the pressure applied to the layers.

Description of the Drawings

FIG. 2 shows schematically a plan view of the tablet of FIG. 1a.

DETAILED DESCRIPTION OF THE INVENTION

Figure 1A:
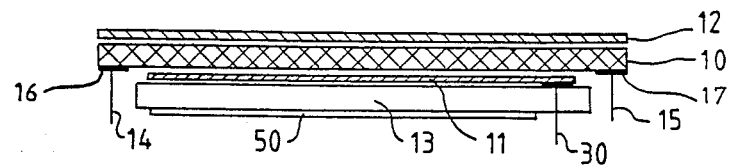
FIG.1a schematically, a cross section through a graphics input tablet according to the present invention.

FIG. 1a shows a graphics input tablet according to the present invention. Layer 10 is a compressible resistive sheet known as Vermahide (Trade Mark). This material has the property that its localized electrical resistance reduces with increased pressure exerted on it as the electrically conducting fibers which make it up are forced into more intimate contact. Beneath layer 10 is layer 11 which is an electrically conducting coat applied to insulating substrate 13. Beneath insulating substrate 13 is conductive coat 50 which may be electrically grounded to give electrostatic screening. Layers 11,13,50 may conveniently be provided by double-sided unetched printed circuit board. Overlying layers 10,11,13,50 is protective sheet 12 which is electrically insulating, physically hard-wearing and yet locally elastically deformable. Electrical connection is made to conductive layer 11 by conductor 30 and to opposed edges of resistive layer 10 by conductors 14,15,21,22 (see FIG. 2).

Figure 1B:
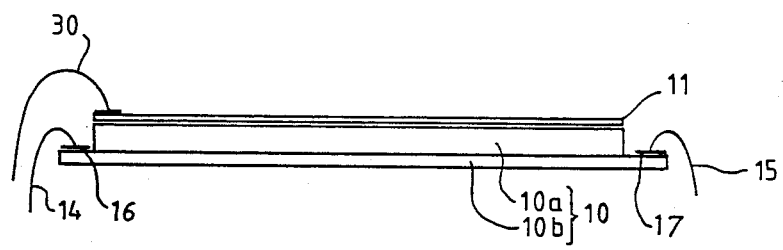
FIG. 1b shows schematically, a cross section through an alternative embodiment of a graphics input tablet according to the present invention.

FIG. 1b shows an alternative tablet comprising two resistive sheets, one compressible 10a and one rigid 10b. Conductive layer 11 overlies the resistive sheets and is locally elastically deformable.

Figure 2:
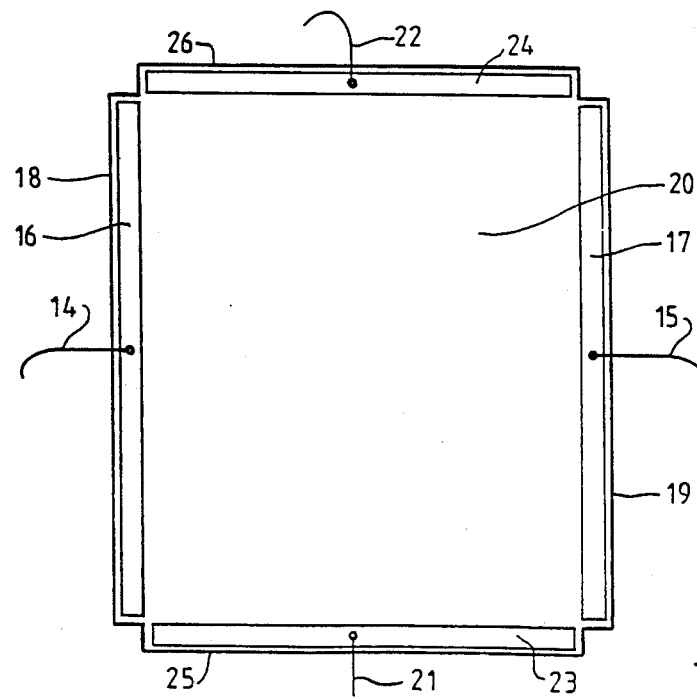

FIG. 2 shows a plan view of the tablet in FIG. 1a. Contact pads 16,17, 23,24 are shown, attached to conductors 14,15,21,22 respectively. Each contact pad makes electrical contact with a portion of the resistive layer: 16,17,23,24 contacting 18,19,25,26 respectively. This leaves the remainder 20 of layer 10 as the input region where a user applies localized pressure with a stylus, causing currents to flow in conductors 14,15,21,22.

Figure 3A:
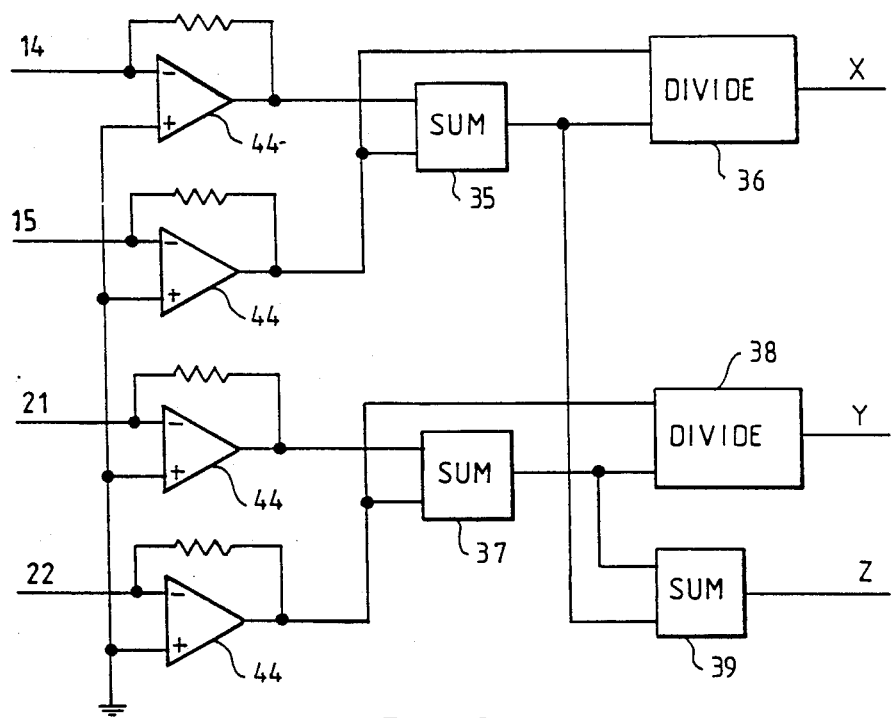
FIG. 3a shows schematically a circuit for processing signals representing positional and pressure information produced by the present invention.

FIG. 3a shows one technique for producing signals x,y,z representing the position of pressure applied on region 20 (x,y) and the magnitude of pressure applied (z). Four current sense amplifiers (44) are provided for measuring the current flowing in the conductors 14,15,21,22. The outputs of the currents sense amplifiers are fed into two analogue summing circuits 35,37, one 35 for conductors 14,15 covering the x dimension and the other 37 for conductors 21,22 covering the y dimension. The outputs of these summers are fed into dividers 36 and 38, respectively, along with one of the current sense outputs in each case. The signal for x (and similarly for y) which this produces is not the simple ratio of currents in opposed conductors 14,15 (or 21,22); rather, if current in 14=I1 and current in 15=I2 then the value of x is:

$$x = \frac{I2}{I1 + I2}$$

This function is selected since it provides a result which varies approximately rectilinearly between 0 and 1.

The signal for z, representing the pressure applied by the stylus is simply a sum of the individual currents in conductors 14,15,21,22. This is obtained by summing in 39 the sums of x and y currents produced by summing circuits 35 and 37, respectively.

Figure 3B:
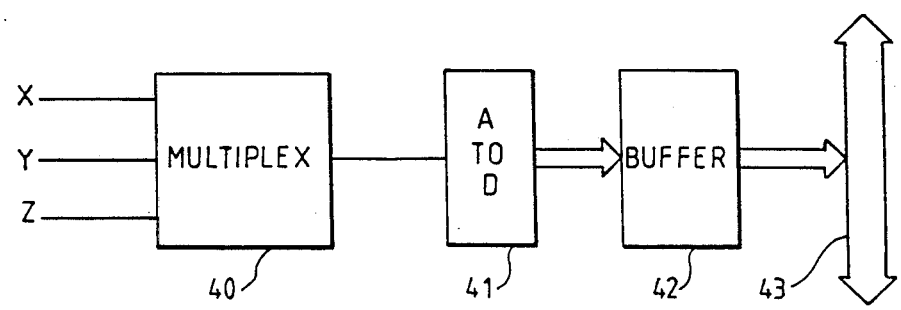
FIG. 3b show schematically a circuit for inputting the outputs of the circuit of FIG. 3a into a computer.

FIG. 3b shows a circuit for inputting x, y and z to a computer. The multiplexer 40 selects each of x,y,z in turn to forward to the analogue to digital converter 41. The results are fed to buffer 42 and thence to data bus 43 which is connected to the computer.

Figure 4:
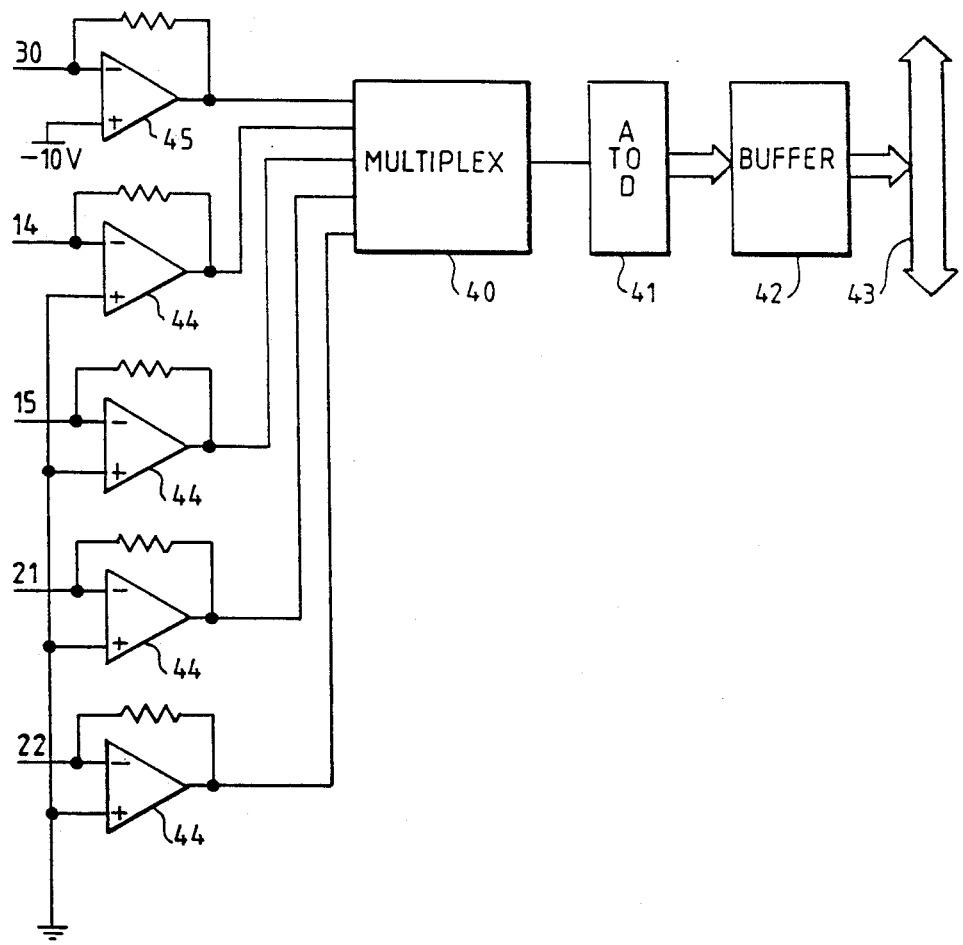
FIG. 4 shows schematically an alternative circuit for processing signals representing positional and pressure information produced by the present invention and inputting this into a computer.

FIG. 4 shows an alternative arrangement to that of FIGS. 3a,3b. In this case, there is an additional current sense amplifier 45 for directly measuring the current in conductor 30. This avoids the expense and inaccuracy of analogue summing circuit 39 (used in conjunction with summing circuits 35 and 37). Further, the generation of the x and y functions is performed in the computer so that the tablet does not need the local intelligence provided by circuits 35,36,37,38. This approach has the disadvantage that more processing is necessary in the computer so that the maximum sampling rate will be lower but it does not require circuits 35,36,37,38,39 so the hardware may well be cheaper to produce.

In use, the conductive layer 11 of the tablet is held at a voltage equal to −10 Volts. The conductors 14,15,21,22 along the edges of resistive layer 10 are held at 0 Volts. When no pressure is applied to the upper surface of the tablet, the physical contact between layers 10 and 11 is very slight and no significant current flows between them. However, when localized pressure is applied to the upper surface, the layers 10 and 11 are pushed into physical and electrical contact so that a current flows from conductive layer 11 to the conductors 14,15,21,22 connected to resistive layer 10. The current through each of these conductors is in inverse relation to the distance from the respective contact pad to the point where pressure is applied.

Another possibility is to have the arrangement as shown in FIG. 4 but without sense amplifier 45 (and its associated resistor). In this case, the computer must sum all four conductor currents digitally. This is a processing overhead which reduces the maximum sampling rate but the hardware will be still cheaper to produce.

Figure 5:
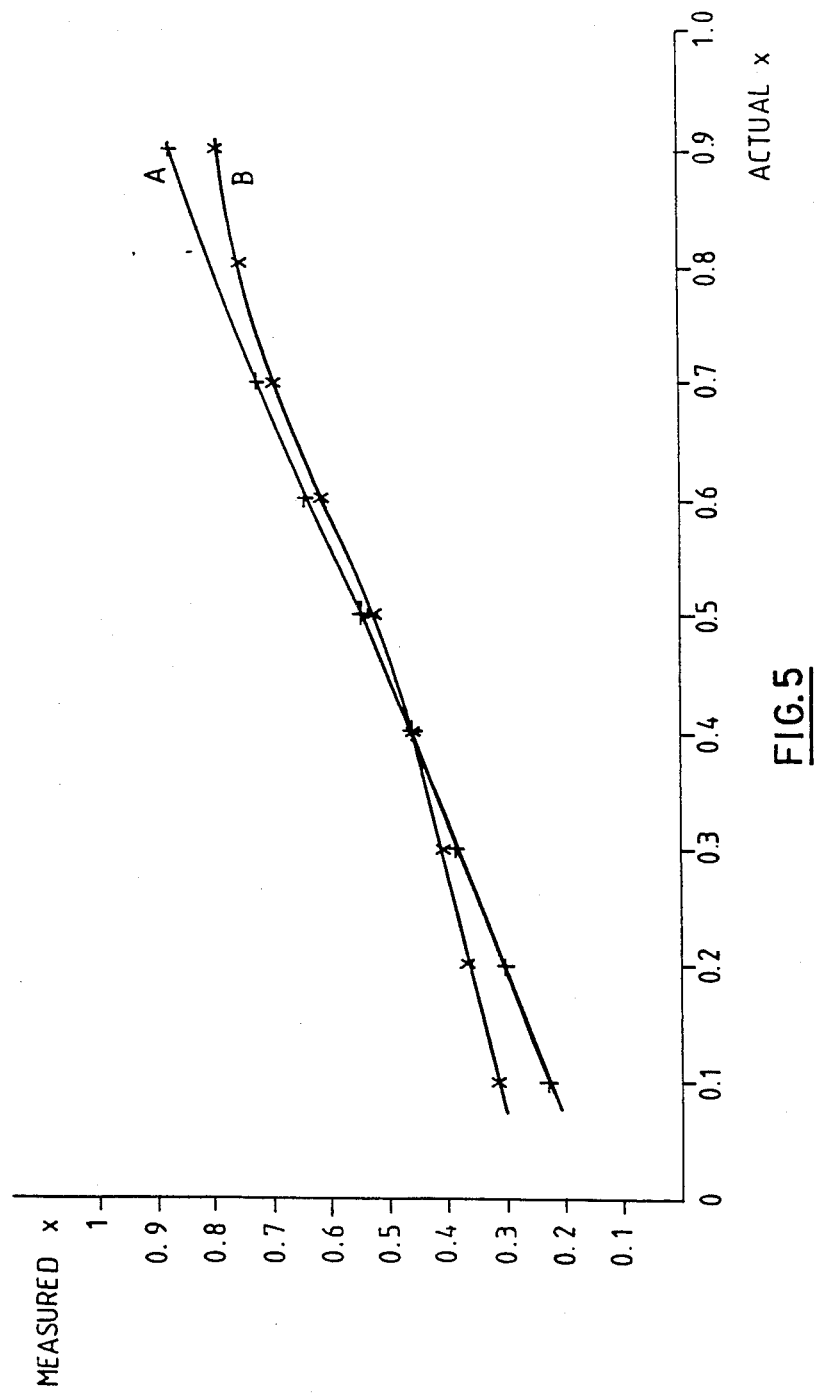
FIG. 5 a schematic graph showing variations in positional measurements versus actual position when employing the present invention.

FIG. 5 shows the variation in the measured value of x versus the actual position at which pressure is applied. It can be seen that there are significant edge effects which mean that it may be necessary to process digitally the measurements once they are received by the computer in order to expand the measured x values to cover the entire range from 0 to 1 (0 is the left-hand edge of area 20 and 1 is the right-hand edge). It may also be necessary to take account of the y displacement when expanding the x readings since the x readings are compressed when taken near y=0 or y=1 compared to readings taken near y=0.5.This is shown by the two lines on FIG. 5, line A being taken at y=0.5 (i.e., across the center of the tablet) and line B being taken at y=0.9 (i.e., near the upper edge of the tablet).

Figure 6:
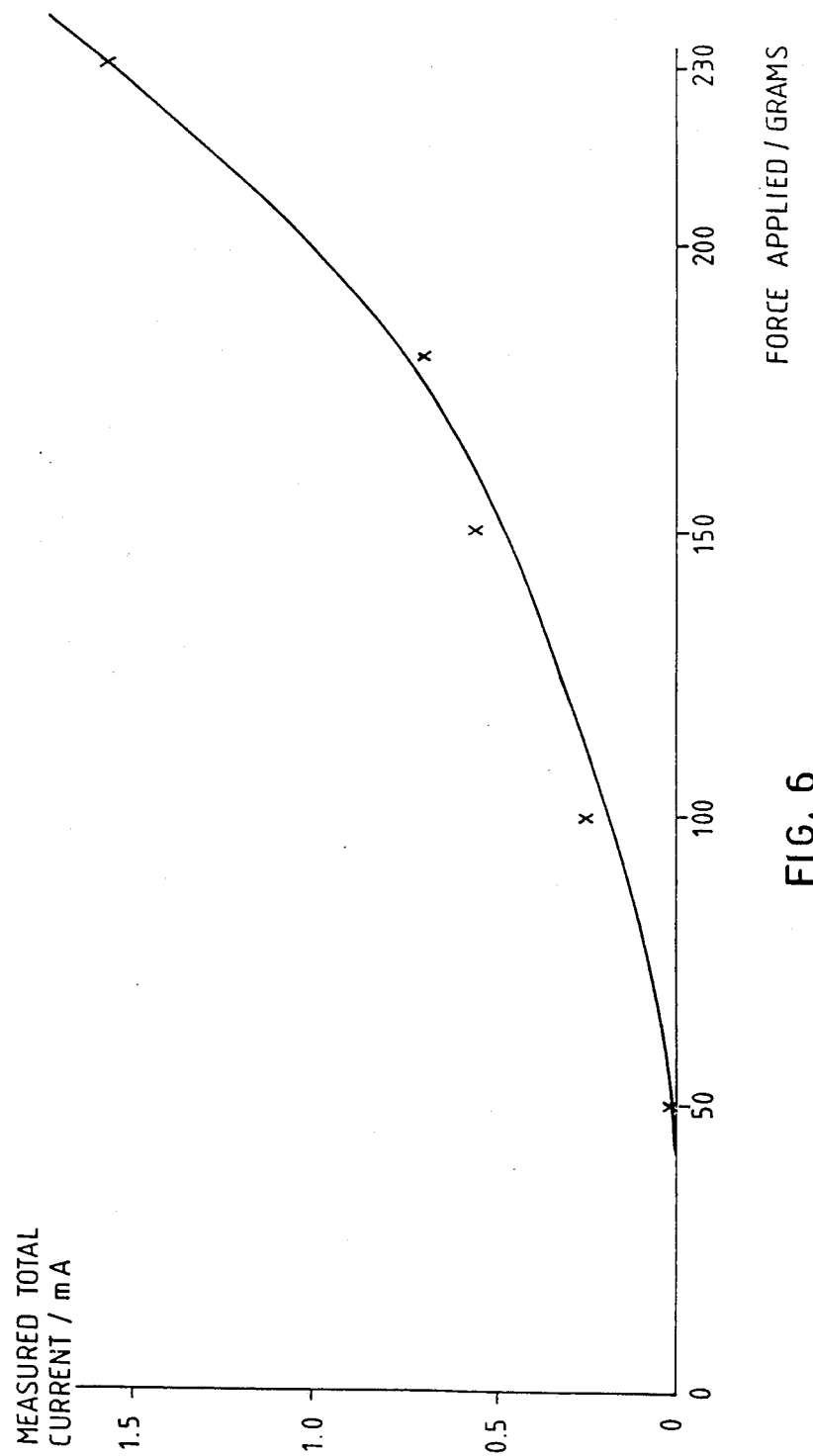
FIG. 6 a schematic graph showing variations in measured total current versus actual force applied to a small area using the present invention.

FIG. 6 shows the variation in measured total current (i.e., z) versus force applied to an area of tablet 1.5 millimeters square. It can be seen that this too would benefit from some digital processing, since the line produced is not as straight as ideally it should be. This would be straightforward to achieve if necessary, for example, by employing a look-up table correlating measured current to applied pressure. It will be noted that below a certain non-zero value for the pressure, the measured total current is zero. This is useful since it means that light pressure (e.g., from a person's hand) will not be detected by the tablet and will not interfere with the normal operation of the tablet.

The variation in current with applied pressure stems from two effects. The first of these is that the resistive material compresses locally, so reducing the electrical resistance in the region of applied pressure since the fibers in the material are in better electrical contact. The second and more significant effect is that the contact area between the conductive and resistive layers increases.

The increase in contact area with increased pressure can cause the measured position to be in error. This happens when the pressure is applied significantly closer to one contact pad than to the opposed contact pad (e.g., closer to 16 than to 17). The increase in contact area with pressure is uniform in all directions but since the contact area is closer to 16 than to 17, the distance from the contact area edge to 16 reduces by a greater percentage than the distance from the contact area edge to 17. This causes the measured position to appear further towards the near edge as more pressure is applied. If this effect is unacceptable, then it would be necessary to compensate for it digitally in the computer by weighting the position measurement towards the center, the level of weighting increasing with increasing pressure (i.e., increasing total current).

Another compensation which may be required is to allow for the fact that, at a constant pressure, the total current increases as the contact point approaches any edge of the tablet. This is because the overall resistance through the resistive sheet from the contact point to the contact pads 16,17,23,24 decreases as the contact point moves further from the center and closer to one or two of the contact pads. If this effect is too large to be ignored, then a suitable weighting could be applied when the data is processed.

The rate at which the location and pressure of the stylus are sampled will depend on the requirements of the application and the circuitry and computer software employed. For graphics input to a terminal and for signature verification a sampling rate of around 10 kHz may be acceptable although a rate of around 20 kHz is preferable.

What is claimed is:

1. A graphics input tablet comprising a layer of electrically resistive material (10) supported co-extensively with a layer of electrically conductive material (11) to provide a flat tablet surface, the resistive material having the property that the electrical resistance between the layers in the region of localized pressure applied thereto changes monotonically with the applied pressure, first and second conductors (14,15) connected respectively to first and second portions of the resistive layer (18,19), said portions being spaced apart on a first notional line across the tablet surface, the construction and arrangement being such that with an electrical potential applied between the resistive layer and the conductive layer substantially no current flows through said first and second conductors, but with said localized pressure applied to said tablet surface currents flow through said first and second conductors, the relative magnitudes of the currents being related to the respective distances of the region of applied pressure from the first and second portions and the total current flowing between the resistive sheet and the conductive sheet being related to the magnitude of the applied pressure.

2. A graphics input tablet as claimed in claim 1, further comprising third and fourth conductors (21,22) connected respectively to third and fourth portions of the resistive layer (25,26), said portions being spaced apart on a second notional line, intersecting said first notional line, across the tablet surface, such that when said localized pressure is applied in said region currents flow in said third and fourth conductors, the relative magnitudes of the currents in the third and fourth conductors being related to the respective distances of said third and fourth portions from the area of applied localized pressure.

3. A graphics input tablet as claimed in claims 1 or 2, further comprising electrical excitation means for applying said electrical potential between the resistive layer and the conductive layer.

4. A graphics input tablet as claimed in claim 3, further comprising electrical sensing means arranged to measure individually the current flowing in each of said conductors and to evaluate the total current flowing between the resistive layer and the conductive layer.

5. A graphics input tablet as claimed in claim 4, in which said electrical sensing means (35 to 44) is arranged to evaluate said total current by summing the individual currents measured in each of said conductors.

6. A graphics input tablet as claimed in claim 4, in which said electrical sensing means (40 to 45) is arranged to evaluate said total current from a measurement of the current flowing between the electrical excitation means and the conductive layer.

7. A graphics input tablet as claimed in claims 1 or 2, in which said resistive layer is rectangular and said conductors are connected each to a different edge of said resistive layer such that each said portion (18,19 or 18,19,25,26) represents substantially the whole of an edge of the resistive layer.

8. A graphics input tablet as claimed in claims 1 or 2, in which the resistive layer comprises two sheets (10a,10b), each of a resistive material, the conductors being connected to a first of said sheets (10b) and the second of said sheets (10a) providing the property as aforesaid that the electrical resistance between the layers in the region of localized pressure applied thereto changes monotonically with the magnitude of the pressure applied to the layers.

9. A graphics input tablet as claimed in claim 4, in which the electrical sensing means comprises analogue current measuring means (44), said tablet further comprising analogue summing means (35,37,39) and analogue dividing means (36,38).

10. A graphics input tablet as claimed in claim 9, further comprising analogue to digital conversion means (41) and buffering means (42) for buffering an output of the analogue to digital conversion means onto a data bus (43) connected to a data processing means.

* * * * *